United States Patent [19]

Ward, III

[11] 4,279,855

[45] Jul. 21, 1981

[54] METHOD FOR THE CASTING OF ULTRATHIN POLYMER MEMBRANES

[75] Inventor: William J. Ward, III, Schenectady, N.Y.

[73] Assignee: General Electric Company, Schenectady, N.Y.

[21] Appl. No.: 536,650

[22] Filed: Dec. 26, 1974

Related U.S. Application Data

[63] Continuation-in-part of Ser. No. 356,514, May 2, 1973, abandoned.

[51] Int. Cl.$^3$ .............................................. B29D 7/02
[52] U.S. Cl. .................................... 264/298; 264/216
[58] Field of Search ................ 264/298, 216, 204, 207

[56] References Cited

U.S. PATENT DOCUMENTS

| | | | |
|---|---|---|---|
| 1,777,308 | 10/1930 | Holweck | 264/298 |
| 1,945,933 | 2/1934 | Chilowsky et al. | 264/298 |
| 2,607,081 | 8/1952 | Taylor | 264/298 |
| 3,580,841 | 5/1971 | Cadotte et al. | 210/23 |
| 3,679,784 | 7/1972 | Rosenberg | 264/298 |
| 3,767,737 | 10/1973 | Lundstrom | 264/298 |

OTHER PUBLICATIONS

Pate & Yaffe, "Techniques for Fabrication—of Very Thin Films", Can. J, Chem., 33, 15(1955), pp. 15–23.

Primary Examiner—James B. Lowe
Attorney, Agent, or Firm—Leo I. MaLossi; James C. Davis, Jr.

[57] ABSTRACT

An improved method is described for the solvent casting of ultrathin non-porous membranes having surface areas of greater than one square foot. Film thicknesses of less than 200 Angstroms are routinely obtained, because the solidified film remains substantially free of tensile stress during the formation and removal thereof from the liquid casting substrate. The casting solution used comprises polymer dissolved in a solvent system and is characterized by being able to spontaneously spread over the surface of the liquid casting substrate. The casting solution is deposited in a narrow, longitudinally-extending defined region at the surface of the casting substrate; the surface area and perimeter of the defined region are enlarged over the surface of the casting substrate in a manner whereby only casting solution is moved relative to the casting substrate and, once desolvated, the polymer film formed remains stationary relative to the casting substrate and substantially free of tensile stress.

9 Claims, 5 Drawing Figures

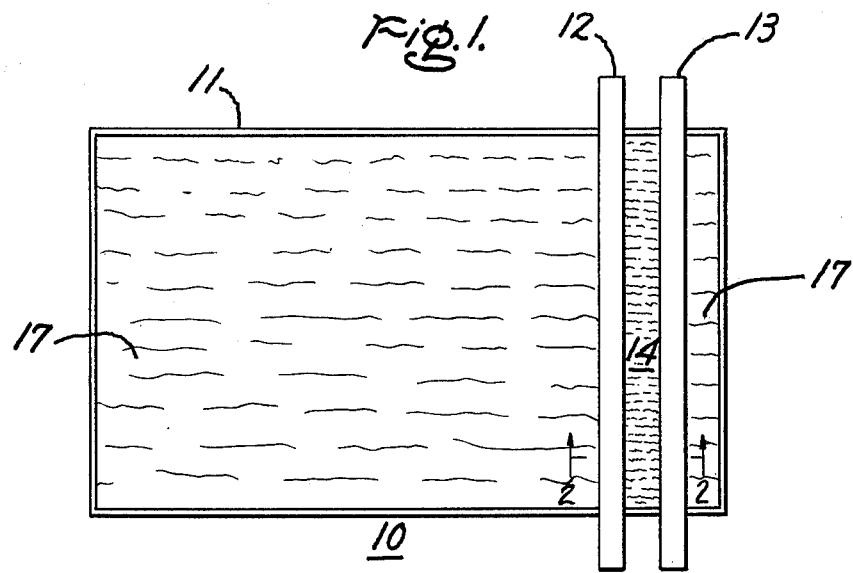
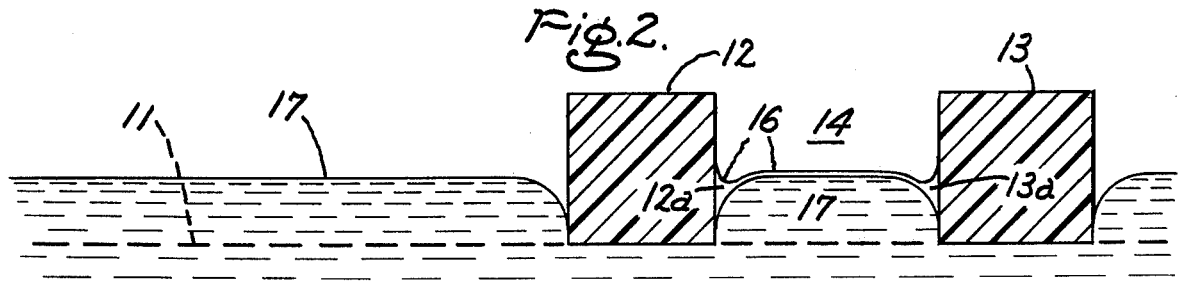
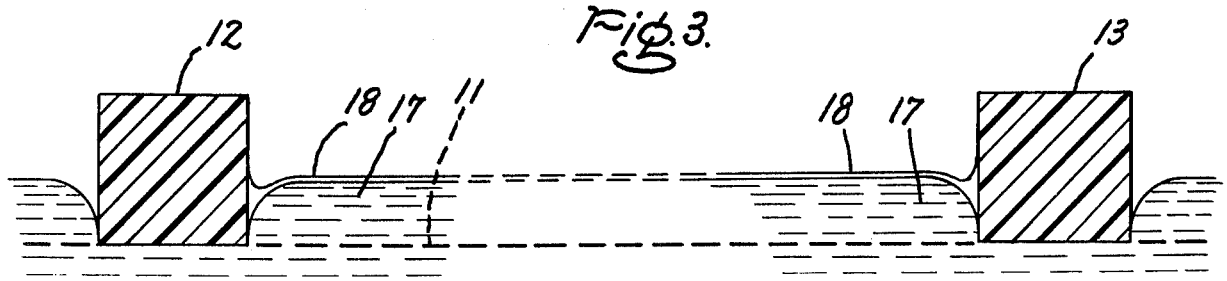

METHOD FOR THE CASTING OF ULTRATHIN POLYMER MEMBRANES

BACKGROUND OF THE INVENTION

This is a continuation-in-part of application Ser. No. 356,514, filed May 2, 1973, now abandoned, and assigned to the assignee of the instant invention.

Two methods for preparing ultrathin semipermeable membranes are described in U.S. Pat. No. 3,580,841—Cadotte et al (column 5, line 54—column 6, line 29). In the first method a concentrated solution of a polysaccharide polymer is poured upon a liquid surface and is permitted to desolvate leaving the polymer membrane as the residue. Membrane thickness (500 Å–5000 Å) is purportedly controlled by regulating the casting solution concentration and viscosity and, in some instances, by manually extending or expanding the solution. The second method consists of slowly drawing a clean glass plate from a dilute solution of a polymer in a solvent. It is indicated that the glass withdrawal rate may be used to control the thickness of the membrane.

In U.S. Patent Application Ser. No. 177,988—Lundstrom, filed Sept. 7, 1971 (now U.S. Pat. No. 3,767,737), ultrathin polymer membranes are prepared by continuously transferring a polymer-containing casting solution upwardly through a floating support liquid for deposition on the upper surface thereof. Some distance away from the station at which this deposition of casting solution occurs, a moving flexible inert support picks up solidified polymer film and pulls it along the support liquid away from the aforementioned deposition station. In this manner new casting surface is continually made available over which the casting solution can spread as it leaves the deposition station. After the casting solution has moved only a short distance from the deposition station most of the casting solution will have evaporated and a continuous polymer film is created. The Lundstrom patent is assigned to the assignee of the instant invention. The thickness of membrane prepared by this method is stated as being in the range of from about 0.005 mil (1300 Å) to about 0.05 mil (13,000 Å).

Another technique for casting a polymer film on a liquid casting substrate is described in the Pate and Yaffe article, "A New Material and Techniques for the Fabrication and Measurement of Very Thin Films for Use In $4\pi$-counting" [Canad. J. Chem. 33, 15 (1955)]. Films of polyvinychloride-acetate (PVCA) copolymer resin are prepared from a casting solution of PVCA in cyclohexanone. Because such a casting solution does not spread satisfactorily on a water surface (i.e. is not able to spontaneously spread over available water surface), conventional techniques for film formation could not be used. By the new method a trough was filled with water at room temperature and a floating wooden barrier was placed in contact with one end. A small amount of the resin solution was pipetted between the barrier and the trough wetting both the barrier and the trough. The barrier was released and the resin solution expanded to a band about 2-3 cm wide and as the edge nearest the barrier became solid the barrier was lifted from the water and lightly placed on the solidified edge of film. The barrier and the solidified edge were moved away over the water surface pulling behind them a film of resin observed to "feed out of the solution band". The resin film continued to be generated in this manner covering the water surface until either the barrier reached the end of the trough or the casting liquid was exhausted.

Thus, in order to carry out either of the latter processes (Lundstrom and Pate et al) the solid film has to be moved relative to the casting substrate. Such manipulative action inherently subjects the solid film to tensile stress. Therefore, in order to survive this action the solid film must be strong enough in tension either because of its thickness or because of the polymer resin employed. The art is still in need of a reliable reproducible method which obviates these limitations, while yielding ultrathin polymer film areas (greater than 1 square foot) amenable to the construction of commercially useful devices, e.g. for gas separation.

SUMMARY OF THE INVENTION

An improved method is described for the solvent casting of ultrathin non-porous membranes having surface areas of greater than one square foot. Film thicknesses of less than 200 Angstroms are routinely obtained, because the solidified film remains substantially free of tensile stress during the formation and, if properly handled, during removal thereof from the liquid casting substrate. The casting solution used comprises polymer dissolved in a solvent system and is characterized by being able to spontaneously spread over the surface of the liquid casting substrate. The casting solution is deposited in a narrow, longitudinally-extending defined region at the surface of the casting substrate; the surface area and perimeter of the defined region are enlarged over the surface of the casting substrate in a manner whereby only casting solution is moved relative to the casting substrate and, once desolvated, the polymer film formed remains stationary relative to the casting substrate and substantially free of tensile stress.

BRIEF DESCRIPTION OF THE DRAWING

This invention will be better understood from the following description and drawing in which:

FIG. 1 is a plan view schematically illustrating the apparatus required in the practice of this invention;

FIG. 2 is an exaggerated view taken on line 2—2 of FIG. 1 showing the interrelationship between the initial concentration of polymer casting solution, the surface of a water casting substrate and the barrier rods, when the contact surfaces of the barrier rods are hydrophobic;

FIG. 3 is a schematic view similar to FIG. 2 showing the desolvated film;

DESCRIPTION OF THE PREFERRED EMBODIMENT

Figure 4:
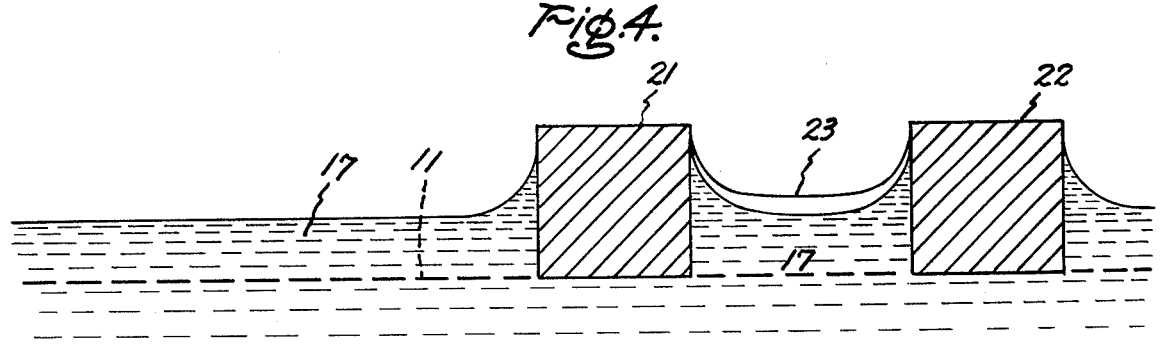
FIG. 4 is a view similar to FIG. 2 showing the interrelationship, when the contact surfaces of the barrier rods are hydrophilic

The film-forming material for use in the practice of this invention includes, in general, any polymer or copolymer, including polymer blends, grafts, blocks and interpolymers capable of formation into substantially hole-free films by solvent casting. The selection of a polymer as part of the casting system of this invention requires that the polymer must not be soluble in the film-support liquid; must not be highly swollen by the film-support liquid, and must be soluble in a solvent, which in turn has a boiling point of at least about 80° C. and is immiscible with the film-support liquid.

The polymer used may be natural or a synthetic substance. In the latter instance, both addition and condensation polymers are included. Organic, inorganic or mixed organic and inorganic polymers may be used. Typical of the useful polymers will be those having repeating units selected from the group consisting of arylene ether, organosiloxane, aromatic carbonate, alkyl acrylate or alkyl methacrylate units or mixtures of any of the foregoing and blends, grafts, blocks or interpolymers comprised of such units.

Polymers of particular importance in the practice of this invention are those which (a) include repeating units comprising bisphenol-A carbonate units and dimethylsiloxane units and those which include repeating units in alternating blocks of bisphenol-A carbonate units and dimethylsiloxane units; and (b) blends of poly-2,6-dimethylphenylene oxide (PPO) and organopolysiloxane-polycarbonate copolymer (as described above, such copolymer being described in U.S. Pat. No. 3,189,662—Vaughn, Jr., incorporated by reference). Organopolysiloxane-polycarbonate copolymer in which alternating blocks of repeating bisphenol-A carbonate units and repeating dimethylsiloxane units are present can be prepared following the teachings of Vaughn above, the resulting materials being alternating, random block polymers of the —ABABA—-type in which the blocks are polydisperse:

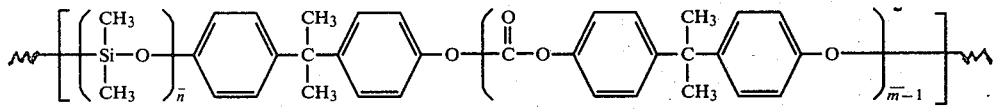

Additional teachings are provided in U.S. Pat. Nos. 3,419,634—Vaughn and 3,419,635—Vaughn on the preparation of silicone/polycarbonate copolymers. PPO/silicone copolymers as prepared in U.S. Pat. No. 3,367,978—White are also useful film formers.

Polymer weight average molecular weight lies in the range 15,000 to 50,000, $\bar{n}$ and $\bar{m}$ being selected to accommodate these values.

The solvent for the casting solution will be selected from normally liquid hydrocarbon organic compounds having, e.g., from one to ten carbon atoms, and such compounds containing, e.g., halogen, nitrogen, oxygen or sulfur atoms and mixtures of the foregoing atoms and compounds. The solvent for any selected polymer casting system must, as noted hereinabove, be immiscible with the support liquid used and have a boiling point of at least about 80° C.

The solvent selected should be able to dissolve the polymer material in moderately high concentration, e.g. about 3–10% by weight.

The casting solution must be able to spread spontaneously over the casting substrate as surface thereof is made available to the casting solution during conduct of the process. Materials described herein meet this criterion when the casting substrate is water.

The preferred solvent system for either the organopolysiloxane/polycarbonate copolymer or the mixture of PPO and organopolysiloxane-polycarbonate copolymer is a mixture of equal volumes of 1,2,3-trichloropropane (TCP) and trichloroethylene.

The preferred film-support liquid is water, however, mercury and various low melting alloys as described in U.S. Pat. No. 3,445,321—Groves (incorporated by reference) may also be employed.

Initially, hole-free polymer films several square inches in area having a thickness of about 250 Å to 500 Å were prepared by simply placing a drop of polymer solution (e.g. 3–6% by weight silicone/polycarbonate copolymer in chloroform) at the edge of a 4″ diameter petri dish filled with water. The drop would quickly spread over the water surface, desolvate and form a solid film. Membranes made in this manner are easily handled for mounting on porous substrates. However, in order to construct practical gas separation devices, membranes having areas of greater than one square foot are required.

Scale-up was, therefore, attempted and a small trough was constructed of plexiglass, which had been thoroughly washed and coated along the edges thereof with paraffin wax to render them hydrophobic. Water, which had been redistilled twice in a quartz still was used to fill the trough until the liquid surface rose slightly above the rim thereof. Care was taken not to contaminate the water. Barriers (rods such as are shown in FIG. 1) were carefully wiped clean and placed on the edges of and spanning the trough, the barriers being spaced from each other a distance defining (with the sides of the trough) the desired film area. Immediately before casting the film, the liquid surface was swept with the barriers three or four times to remove any insoluble greasy material or scums.

After proper preparation of the water support for the film, the membrane casting solution was applied to the surface by allowing approximately one drop (0.0075 cc of a 5% solution by weight) of silicone/polycarbonate copolymer in TCP to fall from a capillary pipette held a few millimeters above the surface of the water. The volume of casting solution was selected, because it was predetermined that the proper volume of polymer would be deposited therefrom to yield a film of desired thickness having the area selected. The casting solution quickly, spontaneously spread over the still water surface covering the area between the barriers (about 4½ inches apart) for the width of the tray before the low vapor pressure solvent had evaporated from the leading edge of the advancing liquid front. The resulting membrane was approximately 25 square inches in area having a thickness of approximately 250 Å. Other thicknesses of film were obtained using various concentrations of polymer in the casting solution.

However, attempts to cast larger area membranes (1–2 square feet) by this method proved unsuccessful, primarily, because a series of drops of the casting solution had to be applied to the clean water surface to deposit the requisite polymer volume for the desired area of solid film. In order to detect the invisible advance of the casting solution upon initiating deposition, before depositing the drops of casting solution small patches of clean talc were dusted on the surface of the water in a series of locations that would be expected to be encountered by the leading edge of the casting solution in spreading over the surface of the preselected area. Almost immediately after the first drop of casting solution reached the surface of the water, the talc deposits at progressive distances from the point of contact of casting solution on the water were swept away into the farthest corner of the open area of water. Thereafter, as the additional drops of casting solution were deposited, this casting solution never extended itself over the preselected area, but created a thicker lens-like layer over only part of the preselected area. There had been no visible leading edge causing the movement of the talc, but it is conjectured that an exceedingly thin (possibly a monomolecular layer) film must have shot out over the free water surface, displaced the talc, desolvated and, thereafter, barred entry of the balance of the casting solution into the area occupied thereby. Since TCP, the solvent used, is a relatively non-volatile solvent, this behavior (lensing of later-applied casting solution) was considered an inherent limitation of this method (which was actually much like the Cadotte et al method) and, thereafter, the relatively large-scale casting apparatus and process of this invention were developed.

Figure 5:
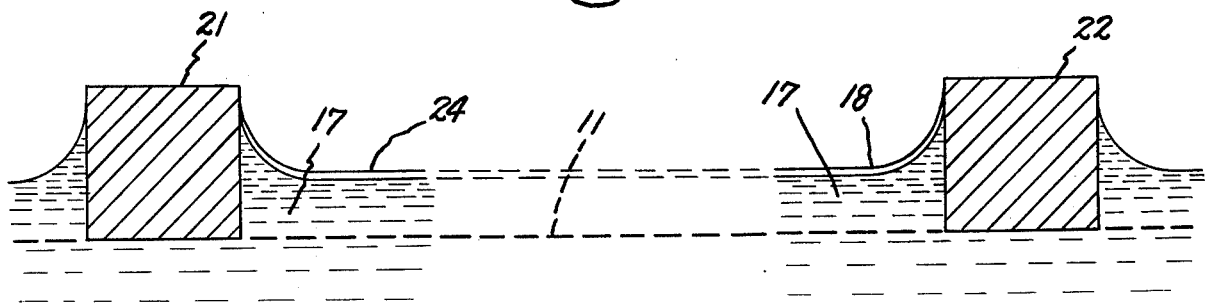
FIG. 5 is a view similar to FIG. 3 reflecting the arrangement of FIG. 4.

Thus, referring to FIG. 1, the apparatus 10 of this invention includes tray 11 and barrier rods 12, 13. In the preferred construction tray 11 is coated with a material to render the surface (at least the edges) thereof hydrophobic, e.g. a coating of polytetrafluoroethylene. The tray dimensions selected were 80 cm × 35 cm, but a tray having larger dimensions, particularly in the direction of the barrier rods, may be employed. In the arrangement shown in FIGS. 2 and 3 barrier rods 12, 13 ($\frac{1}{4}$" square) were coated with polytetrafluoroethylene; in the arrangement shown in FIGS. 4 and 5 the barriers employed were clean $\frac{1}{4}$" square brass rods. Both types of barrier rods work, the use of the hydrophobic rod surfaces being preferred.

Tray 11 is filled to slightly above the rim thereof with water relatively free of surfactants and particulates and barriers 12, 13 are swept over the liquid surface to insure the removal of contaminants floating on the surface of the water. In the arrangement shown barriers 12, 13 are rested on the rim of tray 11 adjacent one end thereof, spaced apart approximately 1 cm to define together with the edges of tray 11 a region (depository 14) to receive the spontaneously spreadable casting solution as described in greater detail hereinbelow. When casting solution 16 is carefully introduced (e.g. drop by drop) into the depository 14 defined by hydrophobic surfaces, this solution 16 floats on the water 17, enters the wells 12a and 13a created by the convex meniscus of the water between the barriers and wets the barriers (FIG. 2). When depository 14 is defined by hydrophilic surfaces (brass barrier rods 21, 22 in FIG. 4), the solution 23 rests in the well formed by the concave meniscus wetting the barriers as shown.

Care is taken not to overload depository 14. If too much casting solution is introduced into depository 14, the casting solution will leak on the far ends of the well. The amount of casting solution that can be added without overloading is not critical. In the case of silicone/polycarbonate copolymers, for example, as much as three times the volume calculated for film formation could be added before spillage occurred. The total volume of solution introduced into depository 14 depends upon the concentration of polymer solution and the area and thickness of the desired film with the provision, of course, that the depository should not be overloaded. A convenient way in which to introduce the casting solution is by the use of hypodermic syringe or dropper. This method offers excellent control on the deposition whereby the maximum acceptable volume of casting solution may be readily determined.

Thereafter, barrier rod 12 is drawn away from (but remains substantially parallel to) barrier 13 toward the opposite end of tray 11. This action results in a controlled enlargement of both (a) the surface area to which the deposited casting solution can spontaneously spread and (b) the perimeter bounding this expanding surface area.

Since various combinations of rate of barrier separation and volatility of the solvent system may be employed, either the full extent of the casting area may be reached before film solidification is initiated or solid film may begin to form shortly after enlargement of the surface area and perimeter of the defined region has begun. However, as the barrier separation occurs in each case there is movement of the casting solution alone relative to the casting substrate and the polymer film formed remains stationary relative to the casting substrate throughout the casting operation. Because of the controlled enlargement of area and perimeter described above the casting solution has no opportunity to create an uncontrolled, fast-moving, fast desolvating monomolecular film ahead of the advancing front.

Conceptually, in those cases in which the interrelationship of the time required to reach the full extent of the desired casting area and the casting solution solvent volatility is such that no solid film is formed before the barrier separation has been completed, the casting solution spread may be best considered as merely a thinning of the bulk liquid initially disposed in depository 14 followed by desolvation of the whole area of cast liquid at the same time. Hereinafter this mode of operation will be referred to as the "thinning mode".

On the other hand, when the interrelationship of the rate of barrier separation and solvent volatility is such that solid film begins to form shortly after barrier movement has been initiated, as the barrier is moved, the well (or reservoir) of casting solution adjacent thereto moves along with it. As new surface area is made available by the barrier movement, casting solution moves up out of this moving reservoir to spontaneously spread over the new area and, thereby, distribute polymer, which remains to form the film after the solvent has evaporated. At the same time previously spread casting solution desolvates to yield a solid film. This is the preferred mode of operation of this invention and hereinafter will be referred to as the "incremental solidification mode".

This newly spread casting solution manifests itself as a colored fringe that extends along the barrier and moves with it. Viewing the colored fringe and the adjacent solidified polymer film, the film appears greyish and, proceeding in the direction of the moving barrier, successive bands of silver, yellow, red and blue may be seen. This colored fringe (in which the color sequence may repeat) only appears along moving barriers, when operating in the differential solidification mode.

As a matter of fact the width of the colored fringe is a simple routine test to ascertain the efficacy of a given casting solution solvent. If the width of the colored fringe is less that about 50 mm (e.g. 5-50 mm) at the desired rate of barrier separation, the casting solution has been properly selected and the desolvation is proceeding in the preferred manner. If the width of the colored fringe extends much beyond 50 mm (e.g. 75-100 mm), the solvent system is not volatile enough, whereupon a compatible solvent that is more volatile should be added to the casting solution to reduce the desolvation time.

The important result of having the casting solution spread only from moving reservoirs adjacent moving barriers during increase in surface area/perimeter from defined regions, when operating in the incremental solidification mode, is that the only relative movement occurring between polymer molecules and the casting substrate occurs when the polymer is in the liquid phase. Desolvated solid polymer film remains stationary on the liquid casting substrate and is free (or substantially free) of tensile stress. Thereafter, as is described hereinbelow, after completion of barrier separation and the last of the desolvation, the desired portion of the solidified film is removed from the casting substrate in a gentle manner (described hereinbelow) so that the freedom from tensile stress is preserved.

By the use of this method, non-porous ultrathin (less than 100 Å) PPO films with surface areas significantly greater than one square foot have been routinely reproduced using silicone-polycarbonate additive.

Although barriers wet by the casting substrate (FIGS. 4 and 5) can be used in carrying out the same manipulative steps, the use of barriers that are not wet by the casting substrate is much preferred.

The importance of employing a casting solution able to spontaneously spread over the liquid casting substrate has been shown by carrying out the manipulative steps of this process (one barrier was moved) employing the polyvinylchloride-acetate copolymer (in cyclohexanone) of Yaffe. The casting solution, that was initially deposited, accompanied the moving barrier during the movement thereof, but since the casting solution did not spread spontaneously, no film was formed.

If desired the water level need not project above the edges of the tray, but in such an arrangement, the barrier rods must have a configuration whereby they recess into the tray for the same placement relative to the liquid surface (setting in the liquid deeper than the meniscus) in order to be effective. The cross-sectional shape of the barrier rods does not appear to be critical.

Regardless of the mode of operation the resulting fully desolvated film appears clear and black and/or light gray (films less than 100 Å) in color having passed through a series of color changes ranging from violet, blue, red, yellow and silver. Loss of color (becoming black or gray) occurs once the thickness of the film has been reduced to a point at which interference patterns are no longer produced in the film by reflected white light.

Once a pool of film-forming solution has been placed in the defined region between the barriers, all that is required is relative movement between these barriers to form film 18 (or film 24), the casting area being bounded at its perimeter by the barriers and the sides of tray 11. This movement may be accomplished manually or mechanically. At least one barrier member must be moved in order to enlarge the defined region. However, obvious extensions of this general teaching are encompassed within this invention. For example, first one barrier and then the other can be moved, rates of barrier movement may be varied, etc.

The maximum rate of movement may be readily determined for the particular casting solution employed, but slow movement of the barrier is preferred, because turbulence in the casting substrate is minimized. Barrier movement is too rapid if the polymer casting solution is unable to remain adjacent thereto. The maximum rate of separation of the barrier rods is typically about 12 inches per minute for the preferred polymer casting solutions (identified hereinabove and in Example 3 below).

Removal of the film from the surface of the casting substrate in a manner substantially free from tensile stress may be accomplished by the use of vacuum-pickup on a microporous surface designed to serve as the substrate for the film or laminations thereof. Apparatus for the film pickup (not shown) in its simplest form consists of a closed chamber having one porous wall (e.g. sintered metal particles) at least the size of the area of film to be recovered. A vacuum is drawn on the chamber after the porous wall has been covered with a layer of microporous substrate (e.g. Celgard ® microporous polypropylene—Celanese Plastics Company; Millipore ® ultrafiltration membrane; Selectron membrane filter) and the substrate is brought into contact with the desolvated film. In this way 80-90% of the solidified ultrathin film can be recovered. Subsequent layers of film may be picked up in the same manner with each new layer sticking to the earlier deposited one. Bubbles of gas entrapped between layers are no problem as the gas is gradually withdrawn by permeation and the film adjusts itself shrinking as the gas leaves.

Hole-free films having surface areas of at least about $42'' \times 77''$ can be made by the method of this invention. A film is "hole-free", if when it is checked for the permeation of two separate gases (e.g. oxygen, nitrogen) therethrough, it is found to have a separation factor (i.e. the ratio of oxygen permeability to nitrogen permeability) at least as great as that for the bulk material of which the film is made.

The prime advantage of being able to make such very thin hole-free films is that a composite hole-free multilayer film can be made therefrom that is stronger, because there is a greater degree of molecular orientation in these thinner films. When three such films of silicone/polycarbonate copolymer are placed one over the other, they become unified. These laminated films appear to have about 30 percent less variation in thickness than occurs in a single film as cast.

It should be emphasized that no attempt is to be made to move or stretch the solid film, because films of the thicknesses contemplated (e.g. less than 100 Å–200 Å) cannot survive such treatment. The control over the advancing reservoir of casting solution is active (by the use of the barrier), however, the spreading of the casting solution to newly available area on the casting substrate is spontaneous and is dependent on the surface-active properties of the solution. Of the following examples the first two illustrate the conduct of this invention in the thinning mode, while the last illustrates operation in the differential solidification mode.

EXAMPLE 1

Casting solution was prepared by dissolving 5 gms of organopolysiloxane-polycarbonate [60% $SiO(CH_3)_2$; 20 $SiO(CH_3)_2$ units per block] copolymer in 100 cc of 1,2,3 trichloropropane (TCP). The casting solution was introduced (about 0.05 cc) as droplets in, and distributed itself along, the long narrow region defined between a pair of spaced barrier rods having hydrophobic surfaces resting on the opposite rims of a water-filled tray, the barriers being in contact with the water. The trough measured $12'' \times 18''$ and the inner surface thereof was coated with polytetrafluoroethylene (PTFE). The barriers, made of PTFE, measured $\frac{1}{4}'' \times \frac{1}{4}'' \times 13''$. One of these barriers was moved away from (but kept reasonably parallel to) the other barrier at a rate of about 2 cm/sec to enclose (with the edges of the tray) a casting surface and film about 1 square foot. Desolvation time of the casting area was about 1 minute.

Desolvated film was picked up by bringing a ring gently into contact with the film, cutting the film away from the ring and lifting up the ring with the attached film. This was repeated in five different locations over the film in sequence to accumulate five layers of film each bonded to those adjacent thereto. The laminate had a yellow color in reflected white light indicating a total thickness of about 1800 Å.

EXAMPLE 2

The casting solution was made up by dissolving 4 gms of PPO in 100 cc of tetrachloroethane and adding thereto 0.8 gms of the organopolysiloxane-polycarbonate [60% $SiO(CH_3)_2$; 20 $SiO(CH_3)_2$ units per block] used in Example 1. A quantity (0.1 cc) of the casting solution was introduced dropwise into, and distributed itself along, the longitudinally-extending narrow region defined between a pair of spaced barriers resting on opposite rims of a water-filled tray. The barriers [rigid metal rods, square cross-section, coated with PTFE] were in contact with the surface of the water along the bottom sides thereof. PTFE tape with pressure-sensitive backing was applied to the rims of the 12"×18" trough.

One of the barriers was moved away from (but kept reasonably parallel to) the other barrier at a rate of about 2 cm/sec until an area of 1–1.5 sq. ft. of casting surface and film was enclosed by the barriers and the trough rims. After desolvation for about 1 minute the entire film had solidified.

Initial evaluation by the drop test on water in a petri dish established that a casting solution of 2.5% by weight PPO in chloroform would not produce useable films. However, it was determined that by adding the proper quantity of an organopolysiloxane-polycarbonate copolymer as a casting aid for the PPO/solvent system, useful defect-free (or substantially so) films could be cast by this process. A determination of the proper percentage of a given organopolysilozane-polycarbonate copolymer to be added to the PPO to produce defect-free film may be routinely made. Thus, initially about 10% dry weight should be added to 90% dry weight of PPO and a casting solution prepared. After the film has been cast, pick up a small area of the film with a ring (as described in Example 1). Examine the film (attached to the ring) in a dark field illumination microscope to determine whether there are any defects in the film. If defects are present, repeat the procedure after adding more of the organopolysiloxane-polycarbonate copolymer. The workable range of organopolysiloxane-polycarbonate copolymer that may be added PPO as a casting aid without reducing the $O_2/N_2$ separation factor below 4.0 (a value not significantly less than the separation factor for PPO) appears to be from about 10 to about 35% dry weight with the preferred amount being about 20% dry weight. Thus, ultrathin membranes prepared from a casting solution of PPO plus about 20% by weight of the silicone/polycarbonate copolymer referred to in Example 1 exhibit an $O_2/N_2$ separation factor the same as, or even slightly greater than, this separation factor for PPO alone. Such is not the case when bulk films are cast of this same mixture of polymers and this separation factor is determined and compared to the separation factor for PPO alone. For these bulk films it was found that the separation factor is less than for PPO alone. This phenomenon is at present unexplained.

When PPO films are cast using about 20% dry weight of organopolysiloxane-polycarbonate and using the preferred solvent mixture, defect-free films having thicknesses of less than 100 Å are routinely produced. When pains are taken to insure a superclean system and barrier movement is very slow, defect-free films having thicknesses of about 75 Å can be readily produced.

EXAMPLE 3

A membrane was cast from a solution of 4% by weight solids, the solids composition being 9% by weight PPO and 91% by weight organopolysiloxane-polycarbonate (57% $SiO(CH_3)_2$; 20 $SiO(CH_3)_2$ units per block) copolymer. The solvent used was a 1:1 (by volume) mixture of 1,2,3 trichloropropane and trichloroethylene.

About 0.05 cc of this casting solution was introduced as droplets in, and distributed itself along, the long narrow (about 1/16" wide) region defined between a pair of PTFE-coated barriers. The barriers extended over the edges of a water-filled tray 6" wide and in contact with the surface of this casting substrate. One of the barriers was moved manually away from the other (keeping reasonably parallel thereto) at a speed of about 1 foot per minute. A fringe of colors adjacent to the moving barrier moved therewith during the enlargement of the casting area by barrier movement.

After making the film, three layers thereof in sequence were picked up on a Nuclepore ® membrane gently laid thereon, separated from surrounding film and picked up. Electrical measurements were employed to determine the soundness of the laminate. This laminate film was free of pin hole defects and had an overall thickness of 260 Å. Thus, the average thickness per layer was 87 Å.

The films (single or laminated) of this invention properly mounted on a microporous substrate find use in gas separation and reverse osmosis devices. The economics of oxygen enrichment (over 40% $O_2$) of air by membrane separation become favorable with the availability of ultrathin PPO polymer films. Having the capability for making such films very thin (e.g. less than 200 Å) and free of defects is most important to this economic viability in order to attain sufficient throughput. Thus, this invention makes available to the art for the first time the combination of throughput and $O_2/N_2$ separation.

What I claim as new and desire to secure by Letters Patent of the United States is:

1. In the process of casting a polymer film wherein a quantity of casting solution comprising polymer dissolved in a solvent system is deposited in a narrow, longitudinally-extending defined region on the surface of a liquid casting substrate, both the surface area and perimeter of said defined region are enlarged over the surface of said casting substrate in a direction transverse to the longitudinal direction of the original defined region and said quantity of casting solution is converted to a thin desolvated, solid polymer film covering an area much larger than the area of said defined region, the improvement comprising the steps of:
   (a) employing a casting solution able to spontaneously spread over the liquid casting substrate, the polymer therein being insoluble in and not subject to swelling by the liquid of said casting substrate, (b) controllably enlarging both the surface area and perimeter of said defined region over the surface of said casting substrate at such a rate relative to the volatility of the solvent system that only casting solution moves relative to said casting substrate during such enlargement, the solid polymer film being formed from the casting solution upon desolvation thereof and remaining stationary relative to said casting substrate and (c) removing at least a portion of the solidified film from the surface of said casting substrate, said portion of solidified film being substantially free of applied tensile stress during the formation thereof and having a surface area of at least about one square foot.

2. The improvement in polymer film casting as recited in claim 1 wherein the casting solution has a solvent content in the range of from at least about 90% to about 99% by weight.

3. The improvement in polymer film casting as recited in claim 1 wherein from the deposition of the casting solution in the defined region until completion of the enlargement of the surface area thereof, the casting solution and solidified film formed therefrom are continually confined about the entire periphery thereof.

4. The improvement in polymer film casting as recited in claim 1 wherein the liquid of the casting substrate is water.

5. The improvement in polymer film casting as recited in claim 1 wherein the polymer material is an organopolysiloxane-polycarbonate copolymer.

6. The improvement in polymer film casting as recited in claim 1 wherein the polymer material is a mixture of poly-2-6-dimethylphenylene oxide and an organopolysiloxane-polycarbonate copolymer.

7. The improvement in polymer film casting as recited in claim 1 wherein the removal of the film is accomplished in a manner whereby the solidified film remains substantially free of applied tensile stress during both the formation and removal thereof.

8. The improvement in polymer film casting as recited in claim 1 wherein the relation between the rate of controlled enlargement of the defined region and the volatility of the solvent system is such that the enlargement is completed before any solid polymer film forms from the casting solution.

9. The improvement in polymer film casting as recited in claim 1 wherein the relation between the rate of controlled enlargement of the defined region and the volatility of the solvent system is such that initiation of the formation of solid polymer film occurs during the enlargement and, once initiated, the solid polymer film formation continues.

* * * * *